(No Model.)

W. SCHMOLZ.
SOLAR REFLECTOR FOR SURVEYING INSTRUMENTS.

No. 246,424.          Patented Aug. 30, 1881.

Witnesses:
Wilmer Bradford
William Foster.

Inventor:
William Schmolz
By C. W. M. Smith
Attorney.

N. PETERS. Photo-Lithographer. Washington, D. C.

UNITED STATES PATENT OFFICE.

WILLIAM SCHMOLZ, OF SAN FRANCISCO, CALIFORNIA.

SOLAR REFLECTOR FOR SURVEYING-INSTRUMENTS.

SPECIFICATION forming part of Letters Patent No. 246,424, dated August 30, 1881.

Application filed May 16, 1881. (No model.)

*To all whom it may concern:*

Be it known that I, WILLIAM SCHMOLZ, a citizen of the United States, and residing at San Francisco, in the county of San Francisco and State of California, have invented a new and useful Solar Reflector for Surveying-Instruments, of which the following is a specification.

The object of my invention is to provide a solar reflector which may be adjustably attached to the telescope of a theodolite or transit-instrument for the purpose of establishing the true meridian, and also to determine the magnetic variation of the compass-needle in any given locality by the passage of the sun through the meridian or by equal altitudes.

Figure 1:
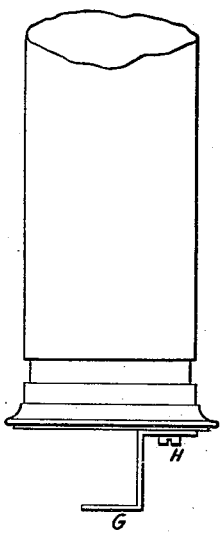
Figure 3:
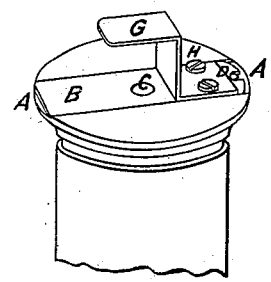
Figure 4:
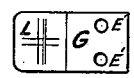
Figure 2:
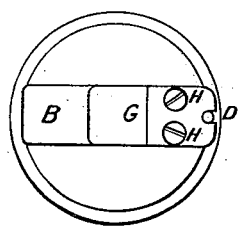
Figure 5:
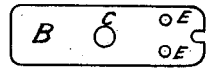

In the drawings which are hereunto annexed, and which form a part of this specification, Figure 1 is a side elevation. Fig. 2 is a plan view. Fig. 3 is a perspective view of the adjustable solar reflector as attached to the telescope. Fig. 4 shows a reverse plan of the reflector, and Fig. 5 shows the metallic slide to which the reflector is attached.

Similar letters of reference are used to indicate like parts throughout the several views.

The cap of the eye-piece of the telescope is provided with a dovetailed groove or slot, A, which receives the metallic slide B. This slide is prevented from passing through the slot by the pin or stud D, set in the cap of the eye-piece, and is provided with a circular aperture, C, at or near its center, through which the rays from the lenses pass to the reflector. The reflector G is attached to this slide by screws H H, which pass through the holes or slots E' E' at the base of the reflector, and enter the threaded holes E E, formed at one end of the slide B. The openings E' E' in the reflector are somewhat larger than the holes E E, so as to permit of its being slightly moved in any lateral direction for the purpose of adjustment.

The reflector G, which is made of a strip of metal bent into the form shown, is provided upon its inner face with a set or series of hour and equatorial lines, L, which should be of sufficient width to receive the reflected image of the sun as produced through the lenses of the telescope.

It should here be observed that the cap of the object-glass of the telescope should be provided with a small hole in the center thereof; and, further, that the distance of the image-receiving portion of the reflector G from the first lens of the telescope is regulated by or depends upon the focal distance of the eye-piece.

Having thus described my invention, what I claim, and desire to secure by Letters Patent, is—

The sliding plate B, provided with a solar reflector, G, adjustably secured thereto, and also provided with an aperture, C, said plate moving in a slot, A, formed in the face of the cap of the eye-piece, all constructed, arranged, and operating substantially in the manner as herein set forth and specified.

In testimony that I claim the foregoing I have hereunto set my hand and seal this 29th day of April, 1881.

WM. SCHMOLZ. [L. S.]

Witnesses:
C. W. M. SMITH,
CHAS. E. KELLY.